(12) United States Patent  (10) Patent No.: US 8,522,548 B2
Smiljanovski et al.  (45) Date of Patent: Sep. 3, 2013

(54) TWIN FLOW SUPERCHARGED ENGINE

(75) Inventors: Vanco Smiljanovski, Bedburg (DE); Norbert Schorn, Aachen (DE); Helmut Kindl, Vaals (NL); Uwe Spaeder, Aachen (DE); Rob Stalman, Selfkant (DE); Franz Brinkmann, Huerth-Efferen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 401 days.

(21) Appl. No.: 12/824,077

(22) Filed: Jun. 25, 2010

(65) Prior Publication Data

US 2010/0326406 A1  Dec. 30, 2010

(30) Foreign Application Priority Data

Jun. 25, 2009 (DE) .................... 10 2009 027 203

(51) Int. Cl.
*F02B 33/44* (2006.01)

(52) U.S. Cl.
USPC ............. 60/605.1; 60/602; 123/315; 123/316

(58) Field of Classification Search
USPC ................ 60/602, 605.1, 605.2; 123/65 EM, 123/315, 316
See application file for complete search history.

(56) References Cited

U.S. PATENT DOCUMENTS

| 3,383,092 | A | 5/1968 | Cazier |
| 4,179,892 | A | 12/1979 | Heydrich |
| 7,861,580 | B2 * | 1/2011 | Sujan et al. ................ 73/114.77 |
| 2003/0000211 | A1 | 1/2003 | Drangel et al. |

FOREIGN PATENT DOCUMENTS

| DE | 698 14 660 T2 | 4/2004 |
| DE | 10 2006 042 463 A1 | 3/2008 |
| DE | 10 2007 057 310 A1 | 6/2009 |
| EP | 2 123 861 A2 | 11/2009 |
| JP | 1-117923 A | 5/1989 |
| JP | 2007-285169 A | 11/2007 |

OTHER PUBLICATIONS

Examination Report of DE 10 2009 027 203.8-13, German Patent and Trademark Office, Apr. 30, 2010, 4 pages.

* cited by examiner

*Primary Examiner* — Ching Chang
(74) *Attorney, Agent, or Firm* — Julia Voutyras; Alleman Hall McCoy Russell & Tuttle LLP

(57) ABSTRACT

Systems and methods for operating a twin flow supercharged engine are provided. The exhaust lines of engine cylinders are grouped into separate manifolds connected to respective inlet ducts of the twin-flow turbine. The inlet ducts of the twin-flow turbine are of different sizes, with different-sized cross sections and/or different-sized exhaust-gas volumes. The exhaust line of a manifold with a smaller exhaust-gas volume is connected to the larger inlet duct, and the exhaust line of a manifold with the larger exhaust-gas volume is connected to the smaller inlet duct.

8 Claims, 3 Drawing Sheets

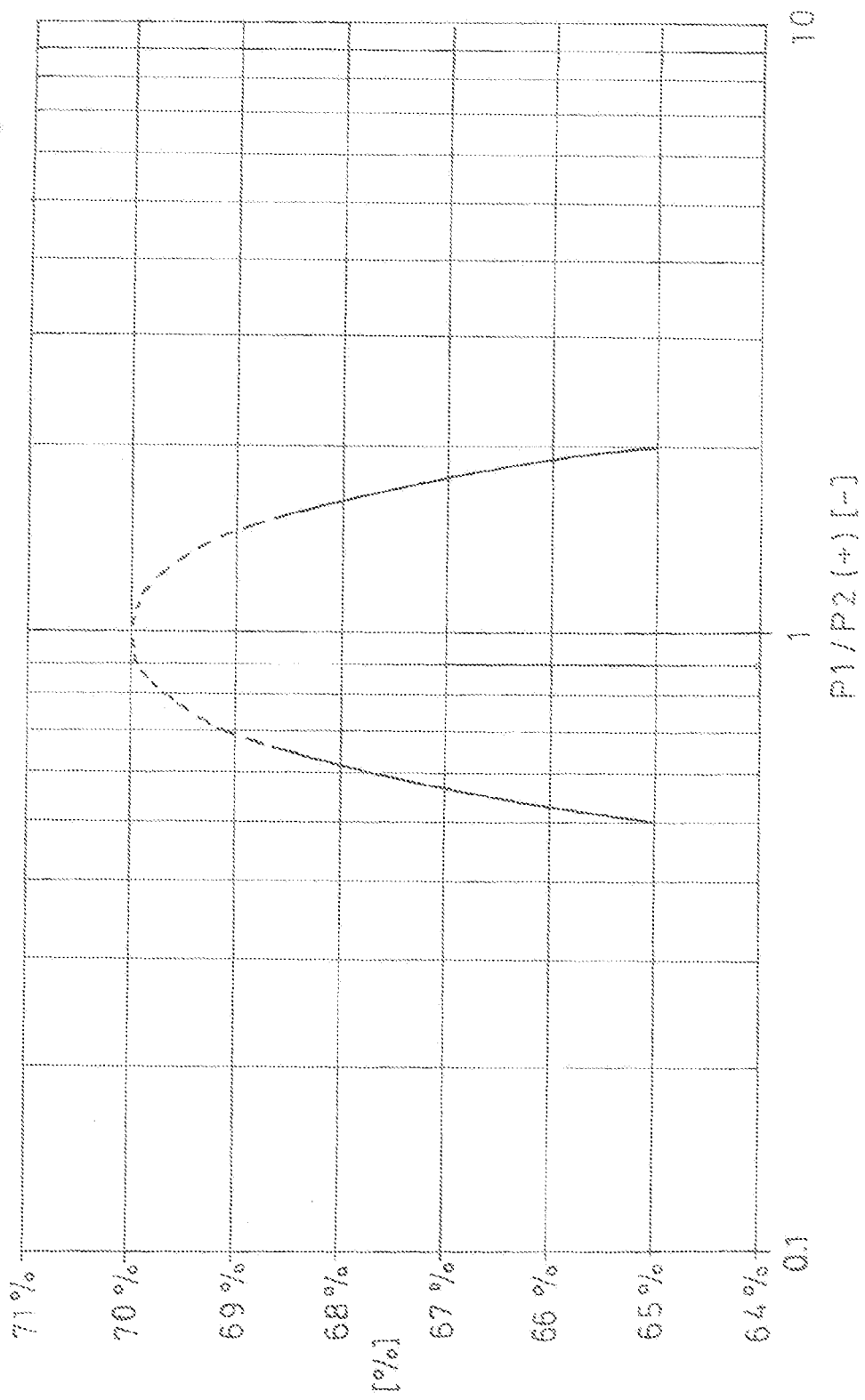

TWIN FLOW SUPERCHARGED ENGINE

CROSS REFERENCE TO PRIORITY APPLICATION

The present application claims priority to German Patent Application No. 102009027203.8, filed Jun. 25, 2009, titled "Supercharged internal combustion engine having at least four cylinders and a twin-flow turbine, and method for operating an internal combustion engine of said type", the entire contents of each of which are incorporated herein by reference.

FIELD

The invention relates to a supercharged internal combustion engine with a twin-flow turbine.

BACKGROUND AND SUMMARY

Internal combustion engines, e.g., spark ignition engines, diesel engines, and hybrid internal combustion engines, have a cylinder block and a cylinder head which are connected to one another to form the individual cylinders (combustion chambers). In some examples, such an engine may include at least four cylinders.

The cylinder head conventionally serves to hold the valve train. To control charge exchange, an internal combustion engine may include various control elements—e.g., lifting valves—and actuating devices for actuating the control elements. The valve actuating mechanism employed for the movement of the valves, including the valves themselves, is referred to as the valve train. During the charge exchange, combustion gases may be discharged via outlet openings of the cylinders, and the charging of the combustion chambers, e.g., the induction of fresh mixture or fresh air, may take place via inlet openings in the cylinders.

In some examples, the exhaust lines of the cylinders may merge to form one common overall exhaust line. In other examples, the exhaust lines of the cylinders may be grouped to form two or more overall exhaust lines. The merging of exhaust lines to form an overall exhaust line is referred to in general and within the context of the present invention as an exhaust manifold, and the part of the overall exhaust line which lies upstream of a turbine arranged in the overall exhaust line belongs to the exhaust manifold.

The selected configuration of the merging cylinder exhaust lines may be dependent on which operating range has priority in the design of the internal combustion engine. For example, the selected configuration of the exhaust lines may depend on which operating ranges the operating behavior of the internal combustion engine should be optimized for.

The inventors herein have recognized that so-called impulse supercharging may be desired in supercharged internal combustion engines which are equipped with at least one turbine on the exhaust-gas side where a satisfactory operating behavior in the low rotational speed or load range, e.g., at relatively low exhaust-gas quantities, is desired.

Here, the dynamic wave phenomena which may occur in the exhaust-gas discharge system—in particular during the charge exchange—may be utilized for the purpose of supercharging and for improving the operating behavior of the internal combustion engine.

The evacuation of the combustion gases out of a cylinder of the internal combustion engine during the charge exchange is based substantially on two different mechanisms. If the outlet valve opens when the cylinder piston is near bottom dead center at the start of the charge exchange, the combustion gases flow at high speed through the outlet opening into the exhaust system due to the high pressure level present in the cylinder at the end of the combustion and the associated high pressure difference between the combustion chamber and the exhaust line. This pressure-driven flow process is assisted by a high pressure peak which is also referred to as a pre-outlet shock and which propagates along the exhaust line at the speed of sound, with the pressure being dissipated or reduces to a greater or lesser extent with increasing distance traveled as a result of friction.

During the further course of the charge exchange, the pressures in the cylinder and in the exhaust line are equalized, such that the combustion gases are no longer evacuated primarily in a pressure-driven manner but rather are discharged as a result of the reciprocating movement of the piston.

At low loads or rotational speeds, e.g., at low exhaust-gas quantities, the pre-outlet shock may advantageously be utilized for impulse supercharging, as a result of which it is possible to obtain high turbine pressure ratios even at low turbine rotational speeds. By means of exhaust-gas turbocharging, it is possible in this way to generate high charge pressure ratios, e.g., high charge pressures, even at low exhaust-gas quantities, e.g., at low loads and rotational speeds.

Impulse supercharging may be particularly advantageous for accelerating the turbine rotor, e.g., increasing the turbine rotational speed, which may be substantially reduced during idle operation of the internal combustion engine or at low load, and which should frequently be increased again with as little delay as possible by means of the exhaust-gas flow in the event of an increased load demand. The inertia of the rotor and the friction in the shaft bearing arrangement generally slow an acceleration of the rotor to higher rotational speeds and therefore hinder an immediate rise in the charge pressure.

The inventors herein have recognized that, in order to be able to utilize the dynamic wave phenomena occurring in the exhaust-gas discharge system, in particular the pre-outlet shocks, for supercharging and for improving the operating behavior of the internal combustion engine, the pressure peaks or pre-outlet shocks in the exhaust system must be maintained. Thus, it may be expedient for the exhaust lines or cylinders to be grouped in such a way that the pre-outlet shocks of the individual cylinders in the exhaust-gas discharge system are maintained.

A cylinder head in which the cylinders are grouped is therefore also a subject of the present invention. According to the invention, at least four cylinders are configured in such a way as to form two groups, where each group includes at least two cylinders. The exhaust lines of the cylinders of each cylinder group merge in each case to form an overall exhaust line so as to form an exhaust manifold, specifically in such a way that the dynamic wave phenomena in the exhaust lines of a cylinder group have the least possible adverse effect on one another.

The two overall exhaust lines can then be supplied separately from one another in each case to the turbine of an exhaust-gas aftertreatment system, or else to a twin-flow turbine.

According to the invention disclosed herein, a twin-flow turbine, which includes an inlet region with two inlet ducts, may be used for supercharging the internal combustion engine. The two overall exhaust lines are connected, separately from one another, in each case to an inlet duct of the twin-flow turbine. The two exhaust-gas flows conducted in the overall exhaust lines are merged downstream of the turbine or while flowing through the rotor of the turbine, but not upstream of the turbine.

If the cylinders or exhaust lines are grouped such that the pre-outlet shocks are maintained for impulse supercharging, a twin-flow turbine in particular is suitable for supercharging.

The use of a twin-flow turbine instead of two separate turbines offers advantages with regard to the densest possible packaging in the engine bay and with regard to the costs of the drive unit. In some examples it may be desirable to arrange the turbine as close to the engine as possible in order to ensure the highest possible exhaust-gas enthalpy at the inlet into the turbine, in order to improve the response behavior of the exhaust-gas turbocharger and to keep the path of the hot exhaust gases to the different exhaust-gas aftertreatment systems as short as possible. A twin-flow turbine has may provide such advantages on account of the restricted spatial conditions.

However, the inventors herein have recognized that said supercharging of the internal combustion engine by means of a twin-flow turbine, which is known from the prior art, has room for improvement. As already mentioned above, the exhaust-gas pressure, in particular the pre-load shock, may be dissipated to a greater or lesser extent along the exhaust line with increasing distance traveled as a result of friction. In some examples, the grouped merging of the exhaust lines of the cylinders may result in two exhaust manifolds with different-sized exhaust-gas volumes. For example, the exhaust lines of the two manifolds may be of different lengths and differ in terms of line guidance, generally being curved to different degrees and with different frequencies.

Such differences may lead to different pressure profiles p(t) in the exhaust gas at the two manifold outlets, and, in particular, to different-sized pressure peaks at the manifold outlets, i.e., at the inlet into the two corresponding inlet ducts of the twin-flow turbine, and consequently to different-sized pressure peaks at the outlet of the two inlet ducts of the twin-flow turbine, i.e., at the inlet into the rotor.

The inventors herein have recognized that the different-sized pressure peaks at the inlet into the rotor may lead to a reduction in turbine efficiency. Thus, in order to be able to operate the turbine provided in the exhaust system optimally, e.g., as efficiently as possible, the pressure peaks at the inlet into the turbine, i.e., at the inlet into the rotor of the turbine, should be substantially equal in size.

In general, in a cylinder head having four cylinders in an in-line arrangement the exhaust lines of the two outer cylinders as a first cylinder group merge to form a first overall exhaust line and the exhaust lines of the two inner cylinders as a second cylinder group merge to form a second overall exhaust line.

Said configuration of the cylinders makes allowance for the fact that the cylinders of a four-cylinder in-line engine are generally ignited in the sequence 1-3-4-2, with the cylinders being numbered successively in series starting from an outer cylinder of the row of cylinders. This proposed grouping of the cylinders ensures that the two cylinders both of the first cylinder group and also of the second cylinder group have an ignition interval of 360° CA, where CA denotes piston crank angle. The two cylinders of each cylinder group therefore have the greatest possible offset with regard to their working processes, which is advantageous with regard to maintaining the pre-outlet shocks.

In some examples, the exhaust manifold of the two outer cylinders in the configuration described above, may have a larger exhaust-gas volume than the exhaust manifold of the two inner cylinders.

The inventors herein have recognized that, as a result, the pressure peak which results from a pre-outlet shock in the overall exhaust line of the second manifold, i.e., at the outlet of the second manifold, may be higher than the pressure peak in the overall exhaust line of the first manifold, i.e., at the outlet of the first manifold. However, according to the prior art, the inlet ducts of the turbine are of equal size.

The inventors herein have recognized that in order to improve the overall efficiency of a twin-flow turbine, the range of fluctuation of the section pressure ratio should be minimized, which may be achieved by means of aligning the pressure peaks associated with each manifold.

Against the background of that stated above, it is an object of the present invention to provide an internal combustion engine as per the preamble of claim 1, e.g., of the generic type, which is optimized with regard to the operation of the twin-flow turbine.

It is a further object of the present invention to specify a method for operating an internal combustion engine of said type.

The first object may be achieved by means of a supercharged internal combustion engine which has at least one cylinder head with at least four cylinders, each of which has at least one outlet opening which is adjoined by an exhaust line for discharging the exhaust gases out of the cylinder, with at least four cylinders being configured in such a way as to form two groups with at least two cylinders, and with the exhaust lines of the cylinders of each cylinder group merging in each case to form an overall exhaust line such that an exhaust manifold is formed, in such a way that the two exhaust manifolds have different-sized exhaust-gas volumes, and at least one twin-flow turbine which has an inlet region with two inlet ducts, with, in each case, one of the two overall exhaust lines opening out into one of the two inlet ducts, and which is characterized in that the inlet ducts of the twin-flow turbine are of different sizes, with different-sized cross sections and/or different-sized exhaust-gas volumes, and the overall exhaust line of the exhaust manifold with the smaller exhaust-gas volume is connected to the larger inlet duct, and the overall exhaust line of the exhaust manifold with the larger exhaust-gas volume is connected to the smaller inlet duct.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF FIGURES

FIG. 2 shows a diagram of the efficiency of a twin-flow turbine designed according to the prior art as a function of the present section pressure ratio $p_1/p_2$ (t).

REFERENCE SYMBOLS

Figure 1A:
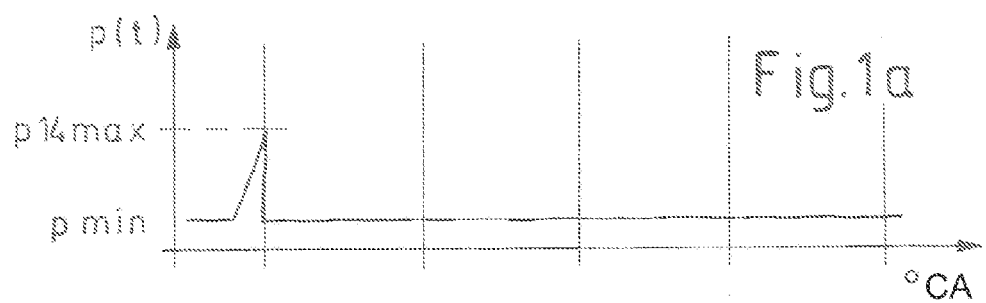
FIG. 1a schematically shows the simplified pressure profile p(t) at the manifold outlet of the first, outer cylinder of a four-cylinder in-line engine as a result of the charge exchange of said first cylinder, over a working cycle of 720 degrees ° CA, FIG. 1b schematically shows the simplified pressure profile p(t) at the manifold outlet of the second, inner cylinder of a four-cylinder in-line engine as a result of the charge exchange of said first cylinder, over a working cycle of 720 degrees ° CA, FIG. 1c schematically shows the simplified pressure profile p(t) at the manifold outlet of the third, inner cylinder of a four-cylinder in-line engine as a result of the charge exchange of said first cylinder, over a working cycle of 720 degrees ° CA, FIG. 1d schematically shows the simplified pressure profile p(t) at the manifold outlet of the fourth, outer cylinder of a four-cylinder in-line engine as a result of the charge exchange of said first cylinder, over a working cycle of 720 degrees ° CA.
Figure 1B:
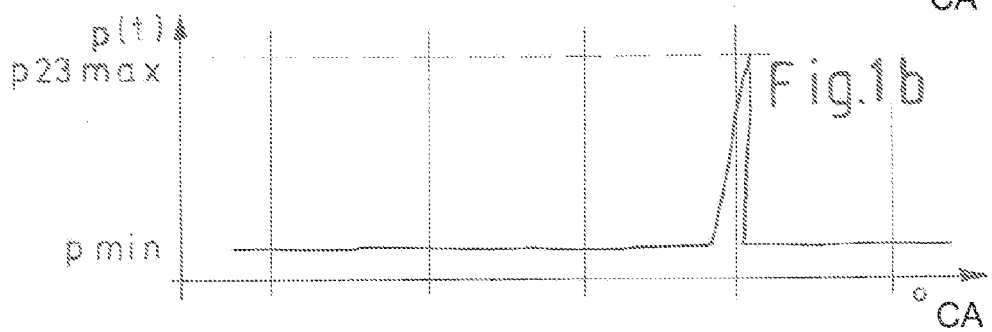
Figure 1C:
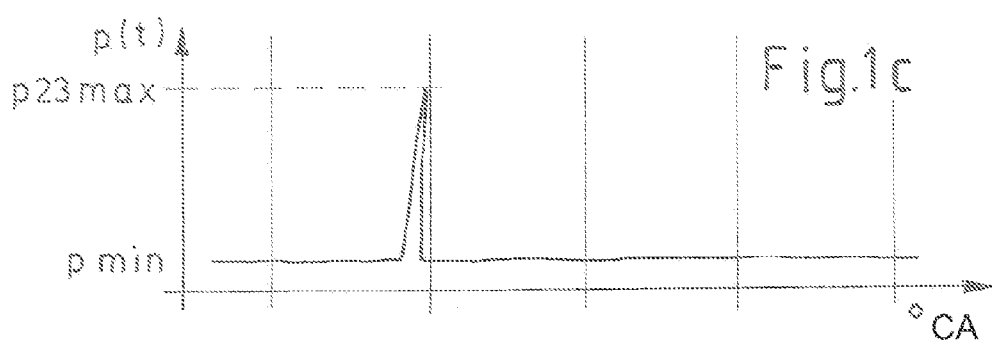
Figure 1D:
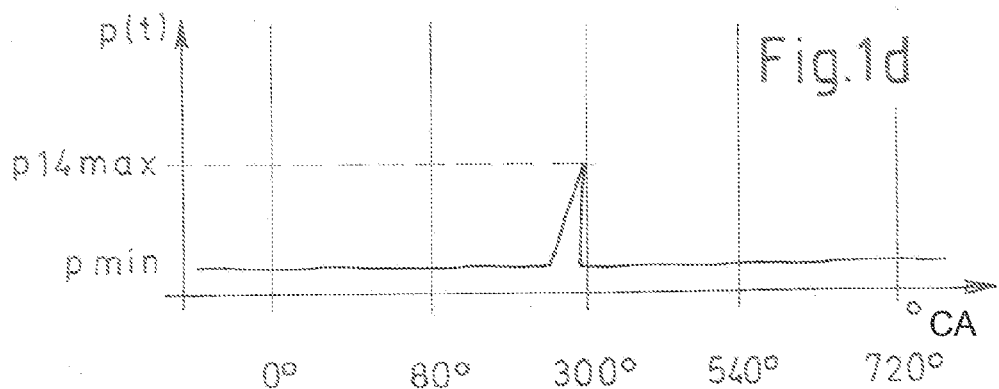

° CA or ° KW: Degrees crank angle.
p(t): Pressure profile over time.
$p_1/p_2$: Section pressure ratio.
$p_{14max}$: Pressure peak at the outlet of the first manifold of the outer cylinders of a four-cylinder in-line engine.
$p_{23max}$: Pressure peak at the outlet of the second manifold of the inner cylinders of a four-cylinder in-line engine.
$p_{14T}$: Pressure peak at the outlet of the turbine inlet duct of the outer cylinders of a four-cylinder in-line engine.
$p_{23T}$: Pressure peak at the outlet of the turbine inlet duct of the inner cylinders of a four-cylinder in-line engine.
$p_1$: Pressure in the first manifold.
$p_2$: Pressure in the second manifold.
$p_{1,max}$: Pressure peak in the first manifold.
$p_{2,max}$: Pressure peak in the second manifold.
$p_{1T}$: Pressure peak at the outlet of the first turbine inlet duct.
$p_{2T}$: Pressure peak at the outlet of the second turbine inlet duct.

DETAILED DESCRIPTION

As described above, the different-sized pressure peaks at the inlet into the rotor may lead to a reduction in turbine efficiency. Thus, to be able to operate the turbine provided in the exhaust system optimally, e.g., as efficiently as possible, the pressure peaks at the inlet into the turbine, i.e., at the inlet into the rotor of the turbine, should be substantially equal in size.

In general, in a cylinder head having four cylinders in an in-line arrangement the exhaust lines of the two outer cylinders as a first cylinder group merge to form a first overall exhaust line and the exhaust lines of the two inner cylinders as a second cylinder group merge to form a second overall exhaust line.

Said configuration of the cylinders makes allowance for the fact that the cylinders of a four-cylinder in-line engine are generally ignited in the sequence 1-3-4-2, with the cylinders being numbered successively in series starting from an outer cylinder of the row of cylinders. This proposed grouping of the cylinders ensures that the two cylinders both of the first cylinder group and also of the second cylinder group have an ignition interval of 360° CA, where CA denotes piston crank angle. The two cylinders of each cylinder group therefore have the greatest possible offset with regard to their working processes, which is advantageous with regard to maintaining the pre-outlet shocks.

In some examples, the exhaust manifold of the two outer cylinders in the configuration described above, may have a larger exhaust-gas volume than the exhaust manifold of the two inner cylinders.

As a result, the pressure peak, $p_{23max}$, which results from a pre-outlet shock in the overall exhaust line of the second manifold, i.e., at the outlet of the second manifold, may be higher than the pressure peak $p_{14max}$ in the overall exhaust line of the first manifold, i.e., at the outlet of the first manifold. According to the prior art, the inlet ducts of the turbine are of equal size, as a result of which the statements made above can be transferred to the two pressure peaks $p_{14T}$, $p_{23T}$ at the outlet of the two inlet ducts of the twin-flow turbine, i.e., at the inlet into the rotor, so that the following relationships apply: $p_{23max} > p_{14max}$ and $p_{23T} > p_{14T}$.

FIGS. 1a to 1d show the cylinder-specific pressure profiles at the manifold outlets, i.e., in the two overall exhaust lines at the inlet into the inlet ducts over a working cycle of 720 degrees crank angle (° CA or ° KW). The inner cylinders 2 and 3 have a higher pressure peak $p_{23max}$ as a result of pre-outlet shock than the outer cylinders 1 and 4, with $p_{14max}$. The lowest pressure $p_{min}$ is assumed to be equal in both lines. Aside from the pressure peak as a result of pre-outlet shock, the pressure is considered to be approximately constant, since only the pressure peak as a result of pre-outlet shock is of interest here.

The section pressure ratio $p_1/p_2$(t), which is relevant for the efficiency, fluctuates during the course of a working cycle of 720° CA in the interval $[p_{min}/p_{23max}, p_{14max}/p_{min}]$ where $p_1$(t) denotes the pressure in the first manifold and $p_2$(t) denotes the pressure in the second manifold, or in the interval $[p_{min}/p_{14max}, p_{23max}/p_{min}]$ where $p_1$(t) denotes the pressure in the second manifold and $p_2$(t) denotes the pressure in the first manifold.

FIG. 2 shows the efficiency of a twin-flow turbine designed according to the prior art as a function of the instantaneous section pressure ratio $p_1/p_2$(t). The highest efficiency is obtained for a section pressure ratio $p_1/p_2=1$. During a working cycle, the pressure ratio fluctuates here in one of the above-specified intervals, with the efficiency travelling along the plotted parabola and assuming, or crossing, the maximum efficiency four times.

As described above, in order to improve the overall efficiency of a twin-flow turbine, the range of fluctuation of the section pressure ratio should be minimized, which may be achieved by means of aligning the pressure peaks $p_{1T}$, $p_{2T}$.

According to the invention, the inlet region of the twin-flow turbine is of asymmetrical design, specifically with different-sized inlet ducts. In this way, the exhaust-gas pressure in each of the two inlet ducts may be targetedly influenced in a different way.

A larger inlet duct assists the pressure dissipation in the flow direction in the exhaust-gas flow conducted through the inlet duct, whereas a smaller inlet duct of smaller cross section and/or with a smaller exhaust-gas volume counteracts the pressure dissipation and, with suitable design, can even generate a pressure rise.

The asymmetrically designed inlet region is now connected in a suitable way to the exhaust lines. The two inlet ducts of the twin-flow turbine and the two exhaust manifolds are configured here such that the overall exhaust line of the exhaust manifold with the smaller exhaust-gas volume is connected to the larger inlet duct and the overall exhaust line of the exhaust manifold with the larger exhaust-gas volume is connected to the smaller inlet duct.

With such an asymmetrically designed inlet region, the influence of the different sizes of exhaust manifolds on the exhaust-gas pressure may be compensated for or reduced.

By means of the different dimensioning of the inlet ducts the different-sized pressure peaks at the manifold outlets $p_{1,max}$ and $p_{2,max}$, i.e., at the inlets into the two inlet ducts, may be aligned as the flow passes through the ducts. Specifically, the different-sized pressure peaks may be aligned in such a way so that the following relationship applies to the pressure peaks upstream of the inlet into the rotor: $p_{1T} \approx p_{2T}$. Namely, so that the pressure peaks upstream of the inlet to the rotor are substantially equal.

Such an alignment of the pressure peaks $p_{1T}, p_{2T}$ directly upstream of the rotor may lead to an improvement in the overall efficiency of the twin-flow turbine.

For the reasons stated, embodiments of the internal combustion engine are advantageous in which the two inlet ducts of the twin-flow turbine are designed such that $|p_{1T}-p_{2T}| < |p_{1,max}-p_{2,max}|$, where $p_{1T}$ and $p_{2T}$ denote the pressure peaks at the outlet of the first and second inlet ducts respectively, and $p_{1,max}$ and $p_{2,max}$ denote the pressure peaks in the first and second manifolds respectively at the inlet into the associated inlet duct.

Embodiments of the internal combustion engine are particularly advantageous in which the two inlet ducts of the twin-flow turbine are designed such that $p_{1T} \approx p_{2T}$, where $p_{1T}$ and $p_{2T}$ denote the pressure peaks at the outlet of the first and second inlet ducts respectively.

Such an internal combustion engine may achieve the first object on which the invention is based, specifically that of providing an internal combustion engine which is optimized with regard to the operation of the twin-flow turbine.

In some examples, the internal combustion engine according to the invention may also have two cylinder heads if the cylinders are arranged distributed on two cylinder banks. Embodiments are also feasible in which not all of the exhaust lines of all the cylinders of a cylinder head merge to form two overall exhaust lines, but rather only some of the cylinders arranged in the cylinder head are grouped in the manner according to the invention.

Embodiments are however particularly advantageous in which the exhaust lines of all the cylinders of the at least one cylinder head merge to form two overall exhaust lines.

Further advantageous embodiments of the internal combustion engine according to the invention will be described in conjunction with the subclaims, and are described below herein.

Embodiments of the internal combustion engine are advantageous in which the at least one cylinder head has at least four cylinders in an in-line arrangement, and the first cylinder group comprises the two outer cylinders and the second cylinder group comprises the at least two inner cylinders.

If the at least one cylinder head has four cylinders in an in-line arrangement, embodiments are advantageous in which the first cylinder group comprises the two outer cylinders and the second cylinder group comprises the two inner cylinders, with the exhaust lines of the two outer cylinders of the first cylinder group merging to form a first overall exhaust line such that a first exhaust manifold is formed, and with the exhaust lines of the two inner cylinders of the second cylinder group merging to form a second overall exhaust line such that a second exhaust manifold is formed.

Embodiments of the internal combustion engine are advantageous in which the two overall exhaust lines of the two cylinder groups or of the exhaust manifolds are arranged offset along the longitudinal axis of the cylinder head.

Embodiments of the internal combustion engine are advantageous in which each cylinder has at least two outlet openings for discharging the exhaust gases out of the cylinder.

As already mentioned, during the discharging of the exhaust gases during the charge exchange, it is a primary aim to obtain the fastest possible opening of the largest possible flow cross sections in order to ensure an effective discharge of the exhaust gases, for which reason the provision of more than one outlet opening per cylinder is advantageous.

Here, embodiments are advantageous in which firstly the exhaust lines of the at least two outlet openings of each cylinder merge to form a partial exhaust line associated with the cylinder, before the partial exhaust lines of a cylinder group merge to form the overall exhaust line of said cylinder group. In this way, the overall length of all the exhaust lines may be shortened and the exhaust-gas volume of the manifold may be reduced in size.

Furthermore, the stepped merging of the exhaust lines to form an overall exhaust line contributes to a more compact, e.g., less voluminous, design and therefore in particular to a weight reduction and to more effective packaging in the engine bay.

Embodiments of the internal combustion engine are advantageous in which the exhaust lines of each cylinder group merge in each case to form an overall exhaust line within the at least one cylinder head, such that one integrated exhaust manifold is formed.

In the case of an exhaust-gas turbocharger being used for supercharging an internal combustion engine, it may be desirable to arrange the turbine as close as possible to the outlet of the internal combustion engine in order thereby to be able to make optimum use of the exhaust-gas enthalpy of the hot exhaust gases, which is determined significantly by the exhaust-gas pressure and the exhaust-gas temperature, and to ensure a fast response behavior of the turbocharger. To improve the response behavior, the exhaust-gas volume in the exhaust lines upstream of the turbine should be as small as possible. Secondly, the path of the hot exhaust gases to the various exhaust-gas aftertreatment systems, which are generally provided downstream of the turbine, should also be as short as possible in order that the exhaust gases are given as little time as possible to cool down so that the exhaust-gas aftertreatment systems reach their operating temperature or light-off temperature as quickly as possible, in particular after a cold start of the internal combustion engine.

In this connection, it is therefore desirable to minimize the thermal inertia of the part of the exhaust line between the outlet opening at the cylinder and the turbine, which can be achieved by reducing the mass and the length of said part. It is expedient here for the exhaust manifold to be fully integrated into the at least one cylinder head. A cylinder head of said type is characterized by a very compact design, with it being possible for the overall length of the exhaust lines of the exhaust manifold, and the volume of the exhaust lines upstream of the turbine, to be minimized.

Embodiments are advantageous in which guide blades for influencing the flow direction are arranged in the inlet region of the twin-flow turbine. In contrast to the rotor blades of the rotating rotor, the guide blades do not rotate with the shaft of the turbine.

If a turbine has a fixed, non-variable geometry, the guide blades—if provided—may be arranged not only so as to be stationary but rather also so as to be completely immovable, i.e. to be rigidly fixed, in the inlet region. In contrast, if use is made of a turbine with variable turbine geometry, the guide blades may be duly also arranged so as to be stationary but not so as to be completely immovable, rather so as to be rotatable about their axes, such that the flow approaching the rotor blades can be influenced.

The second object on which the invention is based, specifically that of specifying a method for operating an internal combustion engine of the above-stated type, may be achieved by means of a method in which the at least four cylinders are operated such that the cylinders of a cylinder group have the greatest possible offset with regard to their working processes.

That which has been stated above regarding the internal combustion engine also applies to the method according to the invention, for which reason reference is made to the statements made above.

In a cylinder head having four cylinders in an in-line arrangement, in which the exhaust lines of the two outer cylinders as the first cylinder group merge to form a first overall exhaust line and the exhaust lines of the two inner cylinders as the second cylinder group merge to form a second overall exhaust line, method variants are advantageous which are characterized in that the combustion is initiated alternately in an outer cylinder of the first cylinder group and an inner cylinder of the second cylinder group.

The initiation or introduction of the combustion may take place either by means of externally-applied ignition, for example by means of a spark plug, or else by means of auto-ignition or compression ignition, for example.

Figure 3:
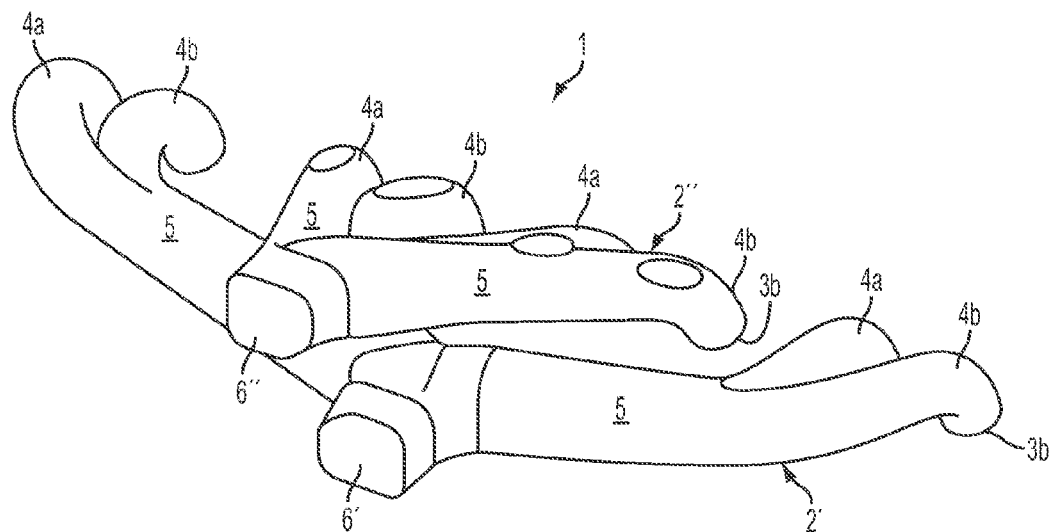
FIG. 3 shows a perspective illustration of the exhaust gas lines integrated in the cylinder head according to one embodiment of the present invention.

FIG. 3 shows a perspective illustration of an example sand core 1 for forming the exhaust gas lines 4a, 4b, 5, 6', 6" integrated in the cylinder head according to one example embodiment. FIG. 1 therefore shows the exhaust system of the exhaust gas lines 4a, 4b, 5, 6', 6" integrated in the cylinder head.

The exhaust gas system 1 comprises the exhaust gas lines 4a, 4b, 5, 6', 6" of a cylinder head of a four-cylinder in-line engine. The cylinders are arranged along the longitudinal axis of the cylinder head. Each of the four cylinders is equipped with two outlet ports 3a, 3b, and an exhaust gas line 4a, 4b adjoining each outlet port 3a, 3b.

The four cylinders are configured in such a way that they form two groups, each with two cylinders. The first cylinder group comprises the two external cylinders and the second cylinder group comprises the two internal cylinders, the exhaust gas lines 4a, 4b of the two external cylinders of the first cylinder group converging into a first overall exhaust gas line 6' within the cylinder head so as to form a first integrated exhaust manifold 2', and the exhaust gas lines 4a, 4b of the two internal cylinders of the second cylinder group converging into a second overall exhaust gas line 6" within the cylinder head so as to form a second integrated exhaust manifold 2". The first overall exhaust gas line 6' of the first exhaust manifold has a larger exhaust gas volume because the exhaust gas lines extend from the external cylinders. The second overall exhaust gas line 6" of the second exhaust manifold has a smaller exhaust gas volume because the exhaust gas lines extend from the inner cylinders.

In this example, the exhaust gas lines 4a, 4b of each cylinder first converge into an exhaust gas subline 5 belonging to the cylinder, before the exhaust gas sublines 5 of the cylinders of a cylinder group subsequently converge into one overall exhaust gas line 6', 6" to form respective exhaust manifolds.

In the exhaust system illustrated in FIG. 3, the two overall exhaust gas lines 6', 6" of the integrated exhaust manifolds 2', 2" are arranged offset along the longitudinal axis of the cylinder head.

It should be appreciated that the embodiment illustrated in FIG. 3 is an example embodiment and the present invention can be applied to alternative exhaust system. For example, as described above, each cylinder of the engine may have one outlet opening.

Figure 4:
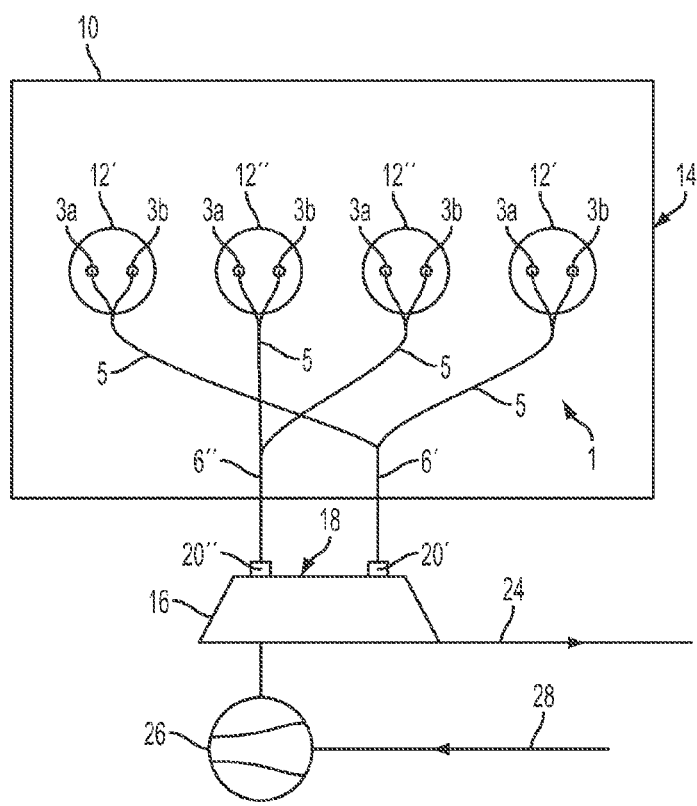
FIG. 4 shows a schematic diagram of an internal combustion engine having a turbocharger according to one embodiment of the present invention.

FIG. 4 shows a schematic diagram of an internal combustion engine having a turbocharger according to one example embodiment of the present invention. Engine 10 is shown to have two inner cylinders 12" and two external cylinders 12'. Engine 10 also includes a cylinder head 14. In the depicted embodiment, the overall exhaust lines are connected to an inlet region 18 of a twin-flow turbine 16. Inlet region 18 of turbine 16 includes a first inlet duct 20' and a second inlet duct 20". First inlet duct 20' has a smaller cross section or a smaller exhaust gas volume than a cross section or exhaust volume of second inlet duct 20'. A first overall exhaust line 6' of a first exhaust manifold 2' is connected to a first inlet duct 20' of turbine 16 and a second exhaust line 6" of a second exhaust manifold 2" is connected to second inlet duct 20" of turbine 16. For example, the two inlet ducts of the twin-flow turbine 16 and the two overall exhaust lines of the two exhaust manifold may be configured so that the exhaust manifold with the smaller exhaust-gas volume is connected to the larger inlet duct of the turbine and the exhaust manifold with the larger exhaust-gas volume is connected to the smaller inlet duct of the turbine. In this way, it may be possible to compensate for, or at least reduce, the influence of the different sizes of the overall exhaust gas line or the exhaust manifolds on the exhaust-gas pressure.

FIG. 4 also shows that the exhaust from turbine 16 may be discharged via conduit 24 to an aftertreatment system (not shown) and air enters a compressor 26 via a fresh air conduit 28.

As illustrated above, one example includes a supercharged internal combustion engine, comprising: at least one cylinder head; at least four cylinders, being configured to form a first cylinder group with at least two cylinders and a second cylinder group with at least two cylinders, each cylinder having at least one outlet opening for discharging the exhaust gases out of the cylinder via an exhaust line; a first overall exhaust line formed by merging exhaust lines of the first cylinder group to form a first exhaust manifold having a first exhaust gas volume; a second overall exhaust line formed by merging exhaust lines of the second cylinder group to form a second exhaust manifold having a second exhaust gas volume and the second exhaust gas volume is less than the first exhaust gas volume; at least one twin-flow turbine including an inlet region with a first inlet duct and a second inlet duct wherein the first inlet duct of the twin-flow turbine has a smaller cross section or a smaller exhaust gas volume and the second inlet duct of the twin-flow turbine has a larger cross section or a larger exhaust volume, wherein the first exhaust manifold is connected to the first inlet duct, and the second exhaust manifold is connected to the second inlet duct.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A supercharged internal combustion engine comprising:
   at least one cylinder head with at least four cylinders, each of which has at least one outlet opening which is adjoined by an exhaust line for discharging exhaust gases out of the cylinder, the at least four cylinders being configured in such a way as to form two groups, each group with at least two cylinders, the exhaust lines of only the cylinders of a first cylinder group merging to form a first overall exhaust line, the exhaust lines of the first cylinder group and the first overall exhaust line forming a first exhaust manifold, the exhaust lines of only the cylinders of a second cylinder group merging to form a second overall exhaust line, the exhaust lines of the second cylinder group and the second overall exhaust line forming a second exhaust manifold, the first exhaust manifold having a different-sized exhaust gas volume than the second exhaust manifold; and
   at least one twin-flow turbine which has an inlet region with a first and a second inlet ducts, wherein the first overall exhaust line opens out into the first inlet duct and the second overall exhaust line opens out into the second inlet duct,
   wherein the inlet ducts of the twin-flow turbine are of different sizes, with different-sized cross sections and/or different-sized exhaust-gas volumes, and
   wherein the overall exhaust line of the exhaust manifold with a smaller exhaust-gas volume is connected to a larger inlet duct, and the overall exhaust line of the exhaust manifold with a larger exhaust-gas volume is connected to a smaller inlet duct.

2. The supercharged internal combustion engine as claimed in claim 1, wherein the two inlet ducts of the twin-flow turbine are designed such that $|p_{1T}-p_{2T}|<|p_{1,max}-p_{2,max}|$, where $p_{1T}$ and $p_{2T}$ denote the pressure peaks at an outlet of the first and second inlet ducts respectively, and $p_{1,max}$ and $p_{2,max}$ denote the pressure peaks in the first and second manifolds respectively at an inlet into the associated inlet duct.

3. The supercharged internal combustion engine as claimed in claim 2, wherein the two inlet ducts of the twin-flow turbine are designed such that $p_{1T} \approx p_{2T}$, where $p_{1T}$ and $p_{2T}$ denote the pressure peaks at the outlet of the first and second inlet ducts respectively.

4. The supercharged internal combustion engine as claimed in claim 1, in which the at least one cylinder head has at least four cylinders in an in-line arrangement, wherein the first cylinder group comprises two outer cylinders and the second cylinder group comprises the at least two inner cylinders.

5. The supercharged internal combustion engine as claimed in claim 4, in which the at least one cylinder head has four cylinders in an in-line arrangement, wherein the first cylinder group comprises the two outer cylinders and the second cylinder group comprises the two inner cylinders.

6. The supercharged internal combustion engine as claimed in claim 1, wherein each cylinder has at least two outlet openings for discharging the exhaust gases out of the cylinder, and firstly the exhaust lines of the at least two outlet openings of each cylinder merge to form a partial exhaust line associated with the cylinder, before the partial exhaust lines of all of the cylinders in the cylinder group merge to form the overall exhaust line of the cylinder group.

7. An engine, comprising:
   two inner cylinders between two outer cylinders inline;
   a first manifold coupled to only the outer cylinders;
   a second manifold coupled to only the inner cylinders, a volume of the second manifold less than the first manifold; and
   a twin-flow turbine including a first duct coupled to the first manifold and a second duct coupled to the second manifold, a cross-section of the first duct being smaller than the second duct.

8. An engine, comprising:
   two inner cylinders between two outer cylinders inline;
   a first manifold coupled to only the outer cylinders;
   a second manifold coupled to only the inner cylinders, a volume of the second manifold less than the first manifold; and
   a twin-flow turbine including a first duct coupled to the first manifold and a second duct coupled to the second manifold, a gas volume of the first duct being smaller than the second duct.

* * * * *